United States Patent [19]

Hanssen et al.

[11] Patent Number: 4,903,771

[45] Date of Patent: Feb. 27, 1990

[54] METHOD FOR ESTABLISHING EFFECTIVE BARRIERS TO PRODUCTION OF UNDESIRED FLUIDS IN THE RECOVERY OF OIL

[75] Inventors: Jan E. Hanssen, Harfsfjord; Steinar Ekrann, Stavanger, both of Norway

[73] Assignee: Rogalandsforskning, Stavanger, Norway

[21] Appl. No.: 239,637

[22] Filed: Sep. 2, 1988

[30] Foreign Application Priority Data

Sep. 2, 1987 [NO] Norway ................................. 873675

[51] Int. Cl.$^4$ ............................................. E21B 43/32
[52] U.S. Cl. .................................... 166/292; 166/300; 166/305.1; 166/309
[58] Field of Search ............... 166/270, 274, 279, 292, 166/300, 309, 305.1, 369

[56] References Cited

U.S. PATENT DOCUMENTS

| | | | |
|---|---|---|---|
| 3,207,218 | 9/1965 | Holbrook et al. | 166/305.1 |
| 3,368,624 | 2/1968 | Heuer, Jr. et al. | 166/309 X |
| 3,529,668 | 9/1970 | Bernard | 166/275 X |
| 3,547,199 | 12/1970 | Froning et al. | 166/305.1 |
| 3,616,858 | 11/1971 | Raza | 166/305.1 |
| 4,662,449 | 5/1987 | Friedman | 166/300 X |

FOREIGN PATENT DOCUMENTS 2555250 11/1986 France .
2149838 6/1985 United Kingdom .

Primary Examiner—Bruce M. Kisliuk
Attorney, Agent, or Firm—Foley & Lardner, Schwartz, Jeffery, Schwaab, Mack, Blumenthal & Evans

[57] ABSTRACT

A reservoir-engineering method wherein horizontal barriers against flow of undesired reservoir fluids into an oil well are formed by density-controlled injection of a barrier-forming fluid mixture having a large penetration depth into the reservoir. A barrier-forming injection fluid may be placed at the fluid contacts in the reservoir independent on whether it is injected at these, in that it has an intermediate density in relation to the reservoir fluids between which it is desired to be placed. Particularly suitable barrier-forming injection fluids are foam-forming chemicals which in several ways may be converted into mobility reducing barriers in situ.

8 Claims, No Drawings

METHOD FOR ESTABLISHING EFFECTIVE BARRIERS TO PRODUCTION OF UNDESIRED FLUIDS IN THE RECOVERY OF OIL

In the production from an oil reservoir having overlaying gas cap and/or underlaying water zone, the oil production rate will often be limited by gas moving downwards towards the perforations in the well, and/or water moving upwards, through these being produced together with or instead of the oil. The total recovery rate can also be reduced as a result of loss of drive energy and/or loss of oil as residual.

The liquid contacts, which originally were horizontal, become deformed and attain a conical shape; the phenomenon is, therefore, called coning: gas coning or water coning depending on which undesired fluid is primarily involved.

Undesired gas or water production will reduce the profitability of a well as a result of the lower oil flow rate, because of the increased separation costs, and possibly because of the smaller amount of recoverable oil. At worst, a marginal field, e.g. a thin oil zone, may become uneconomical to develop, or a field must be abandoned at a relatively early date.

The objective of the present invention is to remedy the above-mentioned disadvantages.

Acccording to the invention, the objective is achieved through the features defined in the following claims.

It has been proposed to counteract coning by establishing artificial barriers against the flow of undesired fluids. By injection of various chemical mixtures which deposit, solidify, harden etc., parts of the reservoir can be wholly or partly plugged. It is desirable that such a treatment be petrophysically selective so that the effective permeability of oil is not reduced as much as those of water and gas, but this has not always been obtainable.

It is still more desirable that an artificial barrier is geometrically selective, i.e. that the shape, size and location of the barrier in relation to the well and the liquid contacts in the reservoir should be controllable in the largest possible degree in such a manner that the barrier attain an optimal effect on the fluid one wishes to shut off from the well.

Particularly, it has been found that a horizontal, disc-shaped barrier is favourable, and that its effect improves with increasing radius or penetration depth.

At present, no treatment methods exist which have proven practically efficient against gas coning.

Against undesired water production, field-tried techniques exist based on injection of water soluble polymers and gels. These may have some petrophysical selectivity, but often no controllable geometrical selectivity. A small penetration depth is obtained, and it is often difficult to avoid invasion and blocking of the oil zone also.

A large horizontal barrier has hitherto only been possible to make by filling up and blocking naturally occuring high-permeable zones. The dependence upon such zones being present makes such a method less general.

An alternative solution which has been proposed is to form artificial horizontal fractures and subsequently seal the fractures with cement, but such a horizontal fracturing is not a well established technique. In addition, only a few reservoirs would be suitable for such treatment.

Simulations which have been carried out, show, however, that under certain circumstances good geometric selectivity can be achieved in the absence of naturally occuring high-permeable zones, provided that the fluid injected has an intermediate density at reservoir conditions relative to the densities of the reservoir fluids. In that case, the fluid injected will naturally place itself at the contact between the reservoir fluids by gravity. Somewhat simplified one may say that it will "float" on the heaviest of the reservoir fluids.

Such a controlled process may suitably be called density-controlled injection.

Furthermore, investigations indicate that the desired location of the fluid injected, may be attained either at the gas/oil contact or at the water/oil contact, wherever in relation to the fluid contacts the injection takes place. Thus, a barrier adjacent to or at the gas/oil contact may be created by injecting, e.g., through the production perforations close to the water/oil contact.

At continued injection, the injection fluid will continue to flow as a radially symmetrical, disc-shaped saturation zone until the desired penetration depth has been achieved.

In addition to the essential requirement concerning correct density, it is an advantage that the viscosity of the injection fluid is relatively low, as this allows for higher injection rates and larger penetration depth. It is also an advantage that at least large parts of the reservoir have relatively high permeability. This also causes relatively small capillary forces and more well defined fluid contacts, which are considered favourable.

A number of potential barrier-forming materials may be injected in such a controlled manner. We have found foam to be a particularly suitable barrier material.

Foam, which can be defined as a dispersion of gas in a continuous liquid phase, is well known to have unique flow properties within the pore network of the reservoir rock. In particular, the gas mobility is reduced strongly by several orders of magnitude. The mobility of water is also reduced, but not as much.

A number of experiments have shown that foam may be formed when gas invades a porous medium saturated with a foam-forming fluid. Most of the foam-forming fluid is displaced, and the residual saturation exists as liquid films constituting the liquid fraction in the foam.

The idea of using foam against the production of undesirable fluids in oil wells, is not novel. However, as put into practice, e.g., in a field test, described in U.S. Pat. No. 3,529,668, the effect against gas coning has been of short duration, so that the gas in the course of a few days has broken through and/or moved around the blocking foam.

This is mainly due to the fact that one was not aware of density-controlled injection; the injected fluids had a higher density than the oil. Therefore, a saturation zone of injected foam-forming fluid of unfavourable shape was achieved, so that the major part of the injected fluid probably sank down into the oil zone without having formed an efficient barrier against gas. This lack of geometric selectivity has also made it impossible to obtain a sufficient extent of the saturation zone. One has probably only reached a few meters outwards from the well. Consequently, in such a badly-controlled process, increasing the amount of injected foam-forming fluid will not be of any use.

The field test referred to is, however, a useful example, because it shows that foam really is capable of functioning as a barrier against undesired gas production during field conditions.

In the present invention, the injection process is controlled by the density of the foam-forming fluid, so that this forms an essentially horizontal saturation zone above the fluid contact. Contrary to said field test, the penetration depth in such a controlled injection process is mainly limited by the volume of fluid injected and the time available for the treatment, so that substantially larger penetration depths can be achieved for a given volume of injection fluid. The penetration depth can be further increased by increasing the injected volume.

A pre-made foam may, because of its low mobility, be difficult to locate as desired in density-controlled injection. According to the present invention, one therefore places a latent foam, namely a foam-forming fluid mixture which is formulated to attain correct density during the injection process. This can for instance, but not exclusively, be done by dissolving surfactants and various additives in non-aqueous solvents, or in water to which sufficient gas has been added to achieve the desired density, but without reducing the mobility as much as in a fully inflated foam.

The blocking foam itself is thus created in situ after the foam-forming fluid mixture is placed. This may for instance, but not exclusively, be done in three ways: By injecting gas immediately after the foam-forming fluid mixture has been placed, by dissolved/suspended gas in the foam-forming fluid mixture being released/expands as the pressure drops and the temperature increases, or at start-up of the oil production from the well so that the reservoir gas itself inflates the foam when it attempts to penetrate the saturation zone of foam-forming fluid.

Thus, after a foam treatment, both inflated blocking foam and latent foam (in the form of foam-forming fluid mixture) will always be present in the reservoir. This gives the foam a further advantage compared with more conventional barrier materials: a particular flexibility.

If, for instance, the gas seeks new paths through the formation because the area adjacent the well is blocked by inflated foam, it will, if the treatment has been efficient, have to penetrate saturation zones of foam-forming fluid. This then creates more foam, and gas blockage occurs here also. Because the foam-forming fluid mixture is mobile and moves predominately by the gravitation forces, it will—after the injection is terminated— spread evenly over the treated area so that possible "holes" are filled.

The flexibility is especially useful when the level of the fluid contacts changes as oil is produced. The foam barrier will be able to follow these movements, because the foam-forming fluid mixture flows predominately by gravity forces and thereby, so to speak, will "float upon" the oil zone, as it moves.

Generally speaking, it must be emphasized that a foam barrier, in contrast to natural or artificial fixed barriers, is a dynamic system which all the time is degraded and reforms by small amounts of gas passing through the foam, and the liquid is continuously drained and foamed again where there is a tendency to gas breakthrough. In the long run, the foam will be weakened because of dilution, dissolution in the reservoir fluids, adsorption, chemical degradation and some production of the foam-forming fluid. It may, therefore, sooner or later be necessary to repeat the treatment. The barrier may possibly be "maintained" by adding more foam-forming fluid through specially made perforations without stopping the production. However, under laboratory conditions it has been found that a foam is capable of blocking gas efficiently for a long time.

A number of commercially available foaming agents may be used in putting the invention into practice, e.g. as indicated in a list given in U.S. Pat. No. 3,529,668, but, of course, other foaming agents may be or may become actual. Suitable foaming agents are available for both aqueous and non-aqueous systems. Especially suitable may be foaming agents which have been developed and field-tested for other reservoir engineering processes such as $CO_2$-flooding or stream injection. Dependent on the individual reservoir, a suitable foam-forming fluid mixture may always be proposed, formulated and tested, without affecting the main features of this invention.

An example of execution of the invention is described below:

In a reservoir having a 20 meters thick oil zone surrounded by thicker gas and water carrying layers, having an average absolute permeability of 1 Darcy and 25% porosity, the gas, the oil and the formation water are presumed to have a density of 0.10, 0.80 and 1.03 $g/cm^3$, respectively, at the pressure and temperature of the reservoir.

A vertical well is perforated in a 5-meter interval from 5 meters above the water/oil contact.

In test production, only marginally economical oil rates are obtained because gas breaks through at 150 $m^3$/day and rapidly reduces the oil production to below 30 $m^3$/day at a high gas/oil ratio.

The well is, therefore, perforated also from 2.5 to 7.5 meters above the gas/oil contact, the production perforations being isolated, and a mixture of 2% foaming agent and various foam-stabilizing admixing materials dissolved in methanol are injected. This solution has a density of 0.77 $g/cm^3$ at reservoir conditions, and therefore flows outwards in the reservoir on top of the oil zone as previously described.

In the course of 72 hours, totally 1000 $m^3$ of this solution is injected, corresponding to a radial zone having 50% saturation of the injection fluid, average thickness 1 meter and radius 50 meters.

The injection perforations are then isolated, the well opened for production, and the oil rate increased up to 150 $m^3$/day. This causes gas to invade the zone saturated with injected foam-forming fluid, but as this generates foam, the mobility of the gas is reduced so much that it does not reach any further. Foam-forming fluid which is displaced downwards, displaces the underlaying oil, until the vertical displacement process ceases.

After some time, an efficient gas-blocking foam fills a larger area around the well; this foam is able to withstand a large pressure drop. Simultaneously saturation zones of unfoamed injected fluid exist further outwards in the reservoir, which constitute a latent barrier to possible gas movements caused by the (lesser) pressure gradients existing in these areas.

As a result of this treatment, the well may now give substantially more oil per day than prior to the treatment. The gas/oil ratio is only marginally higher than expected from dissolved gas, because of the small amounts of gas penetrating through the foam. The costs for establishing the barrier are earned in the course of a number of days of increased production of more than 150 $m^3$/day.

We claim:

1. A method of establishing barriers to flow of undesired reservoir fluids in the recovery of oil from a reservoir through an oil well, comprising:

injecting a barrier-forming fluid mixture from the oil well so that a zone of the reservoir becomes at least partially saturated with the barrier-forming fluid mixture;

said barrier-forming fluid mixture having, at reservoir conditions, an intermediate density between the density of the oil and the density of the undesired reservoir fluids.

2. The method according to claim 1, wherein the barrier-forming fluid mixture forms a foam in the reservoir when displaced by reservoir gas or by externally introduced gas, so that the foam at least partially blocks the flow of undesired reservoir fluid.

3. The method according to claim 2, wherein the barrier-forming fluid mixture is injected through perforations.

4. The method according to claim 3, wherein said perforations are oil production perforations.

5. The method according to claim 3, wherein the barrier-forming fluid mixture comprises material selected from the group consisting of foaming agents, foam stabilizing additives, aqueous solvents, non-aqueous solvents, and gases, said materials being combined so that the density of the barrier forming fluid mixture is between that of the oil and the density of the undesired reservoir fluid.

6. The method of establishing barriers to flow of undesired reservoir gas in the recovery of oil from a reservoir through an oil well, comprising:

injecting a barrier-forming fluid mixture from the oil well;

forming a saturation zone of the reservoir with the barrier-forming fluid mixture;

injecting gas into the saturation zone;

forming a barrier to undesired reservoir fluid;

preventing the flow of undesired reservoir fluids;

said barrier-forming fluid mixture having a density between the density of the oil and the density of the undesired reservoir gas;

whereby when the well is put into oil production causing a pressure drop, the undesired reservoir gas flows into the saturation zone of the barrier-forming fluid mixture.

7. The method according to claim 6, wherein said barrier is substantially disc-shaped.

8. The method according to claim 6, wherein the barrier is continuous.

* * * * *